(12) United States Patent
Dancy et al.

(10) Patent No.: US 9,996,210 B2
(45) Date of Patent: Jun. 12, 2018

(54) ENABLING HOST ACTIVE ELEMENT CONTENT RELATED ACTIONS ON A CLIENT DEVICE WITHIN REMOTE PRESENTATIONS

(75) Inventors: Jerry Alan Dancy, Raleigh, NC (US); Marshall Allen Lamb, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 624 days.

(21) Appl. No.: 13/174,146

(22) Filed: Jun. 30, 2011

(65) Prior Publication Data
US 2013/0007579 A1   Jan. 3, 2013

(51) Int. Cl.
| | |
|---|---|
| G06F 17/22 | (2006.01) |
| G06F 17/27 | (2006.01) |
| G06F 17/21 | (2006.01) |
| G06F 17/30 | (2006.01) |
| G06F 3/0481 | (2013.01) |
| G06Q 50/00 | (2012.01) |

(52) U.S. Cl.
CPC ...... *G06F 3/0481* (2013.01); *G06F 17/30899* (2013.01); *G06Q 50/00* (2013.01); *G06Q 50/01* (2013.01)

(58) Field of Classification Search
CPC ........... G06F 17/2235; G06F 17/30882; G06F 17/21; G06F 17/218; G06F 17/2705; G06F 17/30861; G06F 17/30876; G06F 17/272
USPC ................................ 715/209, 238, 205, 208
See application file for complete search history.

(56) References Cited

U.S. PATENT DOCUMENTS

| | | | | |
|---|---|---|---|---|
| 5,577,188 | A | * | 11/1996 | Zhu ....................... G06F 3/0481 715/202 |
| 6,061,719 | A | | 5/2000 | Bendinelli et al. |
| 6,067,560 | A | * | 5/2000 | Potts, Jr. ........... G06F 17/30899 707/E17.119 |
| 6,075,537 | A | * | 6/2000 | Adapathya et al. .......... 715/760 |
| 6,356,921 | B1 | * | 3/2002 | Kumar et al. ................ 715/203 |
| 6,360,951 | B1 | * | 3/2002 | Swinehart .......... G06K 9/00469 235/462.07 |

(Continued)

OTHER PUBLICATIONS

Microsoft Office Live Meeting User Guide, published Nov. 22, 2007, pp. 1-73.*

(Continued)

*Primary Examiner* — Ahamed I Nazar
(74) *Attorney, Agent, or Firm* — Cuenot, Forsythe & Kim, LLC

(57) ABSTRACT

Enabling active host content related actions on a client device can begin with a client device receiving guest screen data and optionally host screen metadata from a server. The content of the guest screen data can be presented on the client device. A passive element corresponding to each active element of the server host screen can be identified. The active element of the server host screen can be selectable by the presenter and, upon selection (active event), can launch an active action on the server. The passive element of the client guest screen can have a defined selectable overlay hot spot. A hot spot can be can be associated with a hot spot action at the client. The hot spot action taken by the client, upon a hot spot event, can correspond to the active action taken by the server.

20 Claims, 4 Drawing Sheets

(56) References Cited

U.S. PATENT DOCUMENTS

| | | | |
|---|---|---|---|
| 6,448,980 B1* | 9/2002 | Kumar et al. | 715/745 |
| 6,693,649 B1* | 2/2004 | Lipscomb et al. | 715/762 |
| 6,907,563 B1* | 6/2005 | Kumar et al. | 715/207 |
| 7,275,206 B1* | 9/2007 | Bates | G06F 17/215 715/205 |
| 7,742,953 B2 | 6/2010 | King et al. | |
| 2002/0065820 A1* | 5/2002 | Enns | G06F 17/30985 |
| 2002/0120653 A1* | 8/2002 | Kraft et al. | 707/529 |
| 2003/0093564 A1* | 5/2003 | Portuesi | 709/245 |
| 2003/0098877 A1* | 5/2003 | Boegelund | G06F 17/30265 715/730 |
| 2003/0187811 A1* | 10/2003 | Chang et al. | 707/1 |
| 2006/0002315 A1* | 1/2006 | Theurer | G06F 3/0481 370/261 |
| 2006/0010396 A1* | 1/2006 | Beezer et al. | 715/802 |
| 2006/0053233 A1* | 3/2006 | Lin | G06F 3/1454 709/247 |
| 2006/0064642 A1* | 3/2006 | Iyer | 715/730 |
| 2006/0089843 A1* | 4/2006 | Flather | 705/1 |
| 2007/0186166 A1* | 8/2007 | Anderson et al. | 715/730 |
| 2007/0198922 A1* | 8/2007 | Ludmann | 715/520 |
| 2007/0239732 A1* | 10/2007 | Dixit | G06F 17/30887 |
| 2008/0163075 A1* | 7/2008 | Beck et al. | 715/759 |
| 2008/0189648 A1* | 8/2008 | Anglin | G06F 17/30899 715/781 |
| 2008/0235242 A1* | 9/2008 | Swanburg et al. | 707/10 |
| 2008/0316304 A1* | 12/2008 | Claus | G06F 19/3406 348/61 |
| 2009/0259745 A1* | 10/2009 | Lee | 709/224 |
| 2010/0005139 A1* | 1/2010 | Lanahan et al. | 709/203 |
| 2010/0070842 A1* | 3/2010 | Aymeloglu | G06F 17/2288 715/207 |
| 2010/0190143 A1* | 7/2010 | Gal et al. | 434/322 |
| 2010/0257449 A1* | 10/2010 | Lieb | G06Q 10/10 715/730 |
| 2010/0268694 A1* | 10/2010 | Denoue et al. | 707/693 |
| 2010/0268828 A1* | 10/2010 | Pahlavan | G06F 9/4445 709/227 |
| 2010/0269046 A1* | 10/2010 | Pahlavan | G06F 3/1462 715/740 |
| 2010/0306642 A1* | 12/2010 | Lowet | G06F 17/30873 715/234 |
| 2011/0016376 A1* | 1/2011 | Hinson | 715/205 |
| 2011/0154219 A1* | 6/2011 | Khalatian | G06F 3/1462 715/751 |
| 2011/0289155 A1* | 11/2011 | Pirnazar | G06F 9/4445 709/206 |
| 2012/0083294 A1* | 4/2012 | Bray et al. | 455/466 |
| 2012/0133727 A1* | 5/2012 | Bolduc | H04N 7/152 348/14.07 |
| 2012/0195505 A1* | 8/2012 | Park | G06K 9/344 382/176 |
| 2012/0229506 A1* | 9/2012 | Nishikawa | H04N 7/147 345/632 |
| 2012/0266197 A1* | 10/2012 | Andrews et al. | 725/60 |
| 2012/0297318 A1* | 11/2012 | Amrhein | G06F 17/30873 715/753 |
| 2012/0317487 A1* | 12/2012 | Lieb | G06F 9/4445 715/730 |
| 2013/0291024 A1* | 10/2013 | Lefevre | G06K 9/325 725/60 |

OTHER PUBLICATIONS

Lotus Notes Client Version 8.5, Creating an Email Address Link (Hotspot), published Dec. 19, 2009, pp. 1.*

* cited by examiner

ENABLING HOST ACTIVE ELEMENT CONTENT RELATED ACTIONS ON A CLIENT DEVICE WITHIN REMOTE PRESENTATIONS

BACKGROUND

The present invention relates to the field of remote presentations involving network linked computers.

Remote presentations, such as web conferences, offer a unique and advantageous avenue for delivering slide shows in our globalized environment. This is especially true of presentations for today's business and educational climate, where people are trying to maximize their opportunities while minimizing costs. Oftentimes, presenters elect to include additional content (for example, contact information, source information, suggested reading and the like) in the form of URLs or hyperlinks, which point to external servers hosting the additional content

BRIEF SUMMARY

One aspect of the disclosure can include a method for determining active elements (for example, URLs, contact information, and the like) and their respective content within a remote presentation guest session. The referenced active element content can be launched with an appropriate client device application (for example, a web browser, an email client, and the like).

Such a method can begin with a presentation guest client device receiving guest screen data and optionally additional host screen metadata from a server. The content of the guest screen data can be presented on the client device. The guest screen data presented on the client device can include a passive element corresponding to each active element of the server host screen. The active element of the server host screen can be selectable by the presenter and, upon selection, can launch an active event on the server. The passive element of the client guest screen can have a selectable (for example, clickable) hot spot overlay. A hot spot can be can be associated with a hot spot action at the client. The hot spot action taken by the client, upon selection of the hot spot, can correspond to the active action taken by the server.

Another aspect of the disclosure can include a system for enabling active host content related actions on a client device via hot spot actions that correspond to active actions of the server. Such a system can include a server and client device, an active element, a passive element, a hot spot, a presenter configuration interface, viewer configuration interface, and an action handler.

The server device can provide client devices with presentation guest screen data. The client device can render and present guest screen data with passive elements and respective hot spot overlays corresponding to each active element positioned on the host screen. An active element can be selectable (active event) and can lead to the launch of an active action on the server. A hot spot overlay can be selectable (hot spot event) and can lead to the launch of a hot spot action on the client that corresponds to the active action of the server. A presenter configuration interface and viewer configuration interface can define preferences and options set by the presenter utilizing the server and viewer utilizing the client respectively. Options can be associated with the server's active event, active action as well as the client's hot spot, hot spot event and hot spot action. An action handler can be configured to perform the active event and active action as defined in the configuration interfaces. It should be appreciated that above aspect can be implemented in a remote screen sharing scenario.

Yet another aspect of the disclosure can include a computer program product that includes a computer readable storage medium having embedded computer usable program code. The computer usable program code can be configured to present previously received guest screen data on the client including recognizing and painting passive elements with hot spot overlays corresponding to each host screen active element. The computer program code can be configured to identify hot spot actions to be associated with each viewer initiated hot spot selection. The hot spot action upon a hot spot event taken by the client corresponds to an active action triggered by an active event and carried out on the server upon presenter selection of an active element of the host screen.

The above aspects of the disclosure describes various computing scenarios: such as a remote presentation scenario, a remote screen sharing scenario, a cobrowsing scenario, a presentation play-back scenario, a scenario where a client device mimics server-side user interface actions, etc. It should be appreciated that any scenario in which otherwise passive elements of a user interface are made active via the hot spot overlays are to be considered within scope of the present disclosure.

DETAILED DESCRIPTION

Figure 1:
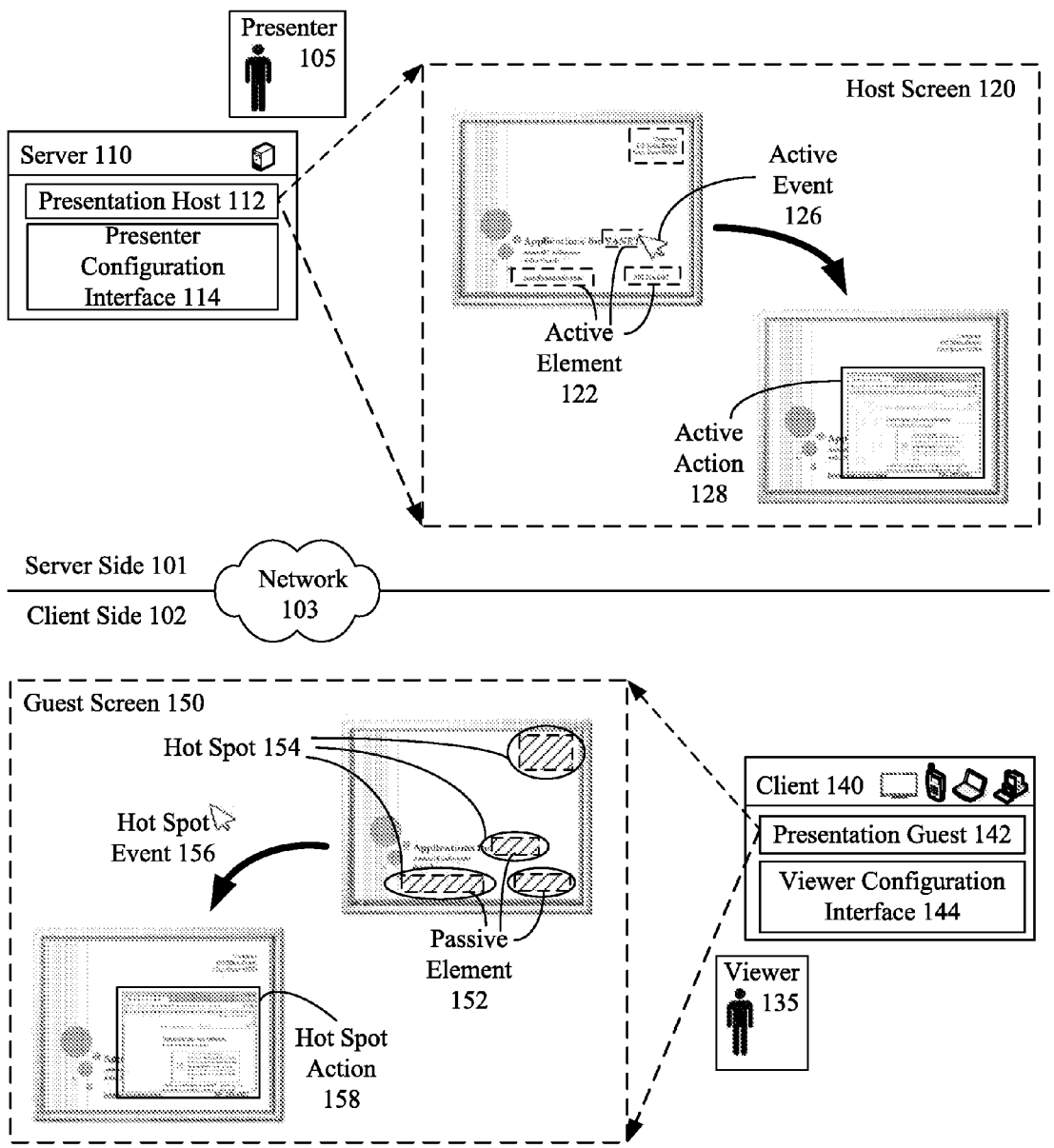
FIG. 1 is a depiction of the several elements of a host and guest environment for a remote presentation in accordance with embodiments of the inventive arrangements disclosed herein.

As previously discussed, presentations delivered via, for example, web conferencing as well as desktop sharing have become common place in our global economy and educational efforts. These presentations are essentially a viewing of a live stream representation of the host screen on the guest screen. The images presented on the guest screen do not contain text data or active data, by default. The image (effectively a graphic) is often re-scalable when viewed on the client device, which results in a scale function being applied to the underlying image.

In embodiments of the disclosure, slide shows (and other types of client-side representations of a host screen) can be enhanced for informational purposes of the viewer with additional content accessible via a web browser or device application. Such additional content can be in the form of URLs (hyperlinks) for suggested reading related to the presentation topic or specific points, citations for the content conveyed by the presenter, elaboration of key concepts, and the like. Another option for additional content can be for presenter contact information such as, but not limited to, email address, phone number, office address information, etc. This information can be utilized with device applications (for example, email client, web browser, VoIP client, etc.).

The benefits of utilizing these web reachable content references in presentations are, for example, that they are universally recognizable and readily accessible at any given time. Drawbacks to these hyperlinks are due to the nature of the remote presentation via web conference. For example, the links are not live on the presentation guest side. The image displayed at the client is conventionally a "dead" or "static screenshot or stream of screenshots of the presentation server. Attempts to solve this problem place the burden of navigating to the additional content referenced entirely to the viewer. This would necessitate that a viewer manually type any URL into their browser, leaving the risk of typographical errors not to mention being time intensive.

Additionally, presentation content is transitory. As soon as the presenter is finished with a slide he or she will move on to the next slide often unaware of whether or not any viewer wishes to or has had time to completely copy down an applicable URL or other additional content of note for future reading. A viewer shifting his or her focus to rushing to copy down presentation referenced additional content in full is also distracting and can diminish the presenter's effectiveness in conveying the intended information.

The disclosure provides a solution for enabling active host content related actions on a client device via hot spot actions that correspond to active actions launched on the server. The original server side host screen can include active elements referencing additional content. On the client side, the guest screen rendered with the presentation guest application can include generated passive elements with a hot spot overlay corresponding to each active element of the host screen. An action handler (or event engine), along with a presenter and viewer configuration interface, can manage client device behavior upon a hot spot event to correspond to active actions on a server.

The disclosure provided solution can allow these actions of calling upon additional content from the client device, in what is conventionally a dead stream representation of host screen content on a guest screen, to occur locally on the client and seamlessly integrate into a viewer's regular computing environment. That means, the viewer would not be inconvenienced in a way that would involve shifting focus away from the presenter and can be unaware of any required background actions, such as but not limited to, the hot spot generation and hot spot action association taking place.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a depiction 100 of the several elements of a host and guest environment for a remote presentation in accordance with embodiments of the inventive arrangements disclosed herein. The remote presentation environment includes a server side 101 connected to a client side 102 via a network 103. The remote presentation is launched on the server side 101 and provides devices on the client side 102 with data necessary to implement the enabling of hot spot actions 158 equivalent to active actions 128 of a server side 101. For example, server 110 can be a device local to presenter 105's geographical location. In another embodiment, server 110 can be a cloud located device to which presenter 105 has previously uploaded his or her presentation file to be accessed at a later presentation date or time.

On the server side 101, presenter 105 can utilize server 110 to host a remote presentation. Server 110 can be any device including hardware and/or software components that support the data exchanges for the remote presentations being performed or hosted. For example, a server 110 can utilize any presentation host 112 applications such as, but not limited to, screen sharing applications or web conference hosting applications to perform remote presentations.

Server 110 can also include a presenter configuration interface 114 that is dedicated to recording and maintaining default as well as ad hoc presentation specific settings for presenter 105 desired preferences for the type or amount of active content to share with presentation guests. Presenter 105 preferences maintained by presenter configuration interface 114 can be, for example, whether or not to allow actions to be taken from an email address; such allowed action can be that, upon a guest selecting the email address from their guest view, an email client compose window with the shared email address already placed in the address field can be launched.

Another example can involve an embedded hyperlink for additional background content (active element 122). Host screen 120 can display a rendering of presentation data and can include a number of active elements 122 within the presentation hosted by presentation host 112 application. Active elements can include any additional content designated by presenter 105 in creating the presentation to be given remotely. Such information can be, but is not limited to, URL references, phone numbers, email addresses, physical addresses, and embedded content.

Upon an active event 126 launch, such as selecting the active element 122 with a mouse cursor, an active action 128 can result in the launch of a local web browser with the hyperlink content of the active element 122. The above described actions can conventionally only occur on the host/server side 101 of a remote presentation in progress. They are not "clickable" or live locally on the client side 102.

On the client side 102 a viewer 135 can utilize client 140 device to partake in a remote presentation environment via network 103. Client 140 can be any computing device with a display that has web connectivity. Client 140 can be, but is not limited to, a personal computer, a smart phone, and the like. Client 140 can be a general purpose computing device able to have its functionality modified by updating or changing installed applications, can be a special purpose computing device designed for a specific set of functionality that is not user modifiable (or minimally so, such as through a firmware upgrade), or can be a device with an intermediate level of user modifiability (i.e., plug-ins or apps can be installed by a user who is otherwise not able to modify core functionality of the device).

Client 140 can include a presentation guest 142 application and a viewer configuration interface 144. Presentation guest 142 application can be any applicationallowing for client 140 participation in a remote conference via network 103 access. Viewer configuration interface 144 can record and maintain viewer 135 preferences for passive element associated content, events and actions. Preference settings can include default as well as ad hoc settings for presentations. Preference settings maintained in viewer configuration interface 144 can also be automatically determined. For example, a user device with multiple browser applications installed can keep track of a default browser utilized by viewer 135 or a preferred application to access additional web content.

These viewer 135 configuration preferences can also include viewer 135 computing behavior history such as redirecting and launching additional selected content on a separate screen or device (for example, a mobile device, television, tablet device, etc.) linked to client 140 via a separate network. This can be beneficial in avoiding presentation slide content from being obscured.

Guest screen 150 can display remote presentation images based on guest screen data provided by server 110 over network 103. Guest screen 150 rendered images can include a set of passive elements 152 corresponding to the region of host screen 120's active elements 122. Each passive element 152 can have a corresponding hot spot 154 overlay. The overlay can be non-visible so as not to obscure presentation images and their corresponding information. The overlay can also be positioned on top of the passive element as determined by a z-order of the client application running the presentation.

Hot spot 154 overlay is associated with actual passive element content (either identified by parsing the screen or interpreting host screen metadata). Upon a hot spot event 156 occurrence, for example a mouse click selection of the hot spot 154 region, hot spot action 158 can be launched. Hot spot action 158 can correspond to active action 128 of server 110 upon the same regionally located hot spot 154/active element 122 selection.

For example, the active action 128 on the server associated with a specific active element 122 can consists of passing on active element content information to a local browser application and launching the browser application directed towards the hyperlinked content address. The corresponding hot spot action 158 can pass along the same content information as is associated with the server side 101 active element 122 and can launch a browser application local to the client 140 directed towards to the passive element 152 content. The passive element 152 content is equivalent to the active element 122 content.

It should be appreciated that the disclosure applies to real-time situations or near-real times, where the host screen 120 and guest screen 150 are synchronized, as well as time-delayed situations. For instance, the client 140 (or more specifically the presentation guest 142 application) can include a function for playing back a set of screens. In one embodiment, this playback may automatically follow timing delays or sequencing of an original presentation/event. In another embodiment, the play-back timing can be viewer 135 controlled. Regardless, the guest screen 150 (during the playback) can overlay otherwise passive elements 152 with hot spots 154 to produce actions 158 that correspond to the active action 128, thus turning an otherwise static or passive element into an active one. As use herein, the time-delay can occur a significant time after the content was presented, such as a few minutes, hours, days, weeks, etc. after the content was presented in the host screen 120.

Figure 2:
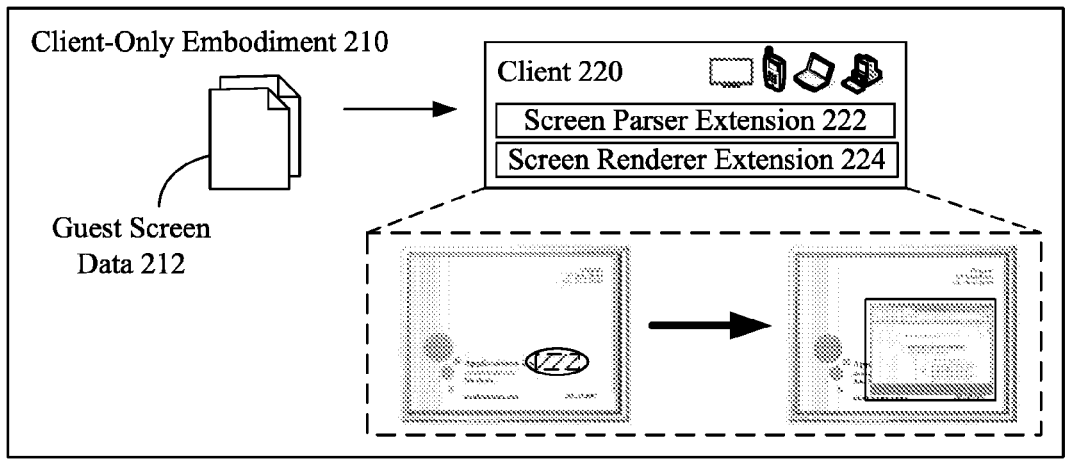
FIG. 2 is a depiction of a client-only embodiment receiving guest screen data and creating hot spot overlays in accordance with embodiments of the inventive arrangements disclosed herein.

FIG. 2 is a depiction 200 of a client-only embodiment 210 receiving guest screen data and creating hot spot overlays in accordance with embodiments of the inventive arrangements disclosed herein. The client-only embodiment 210 can include a client 220 receiving only guest screen data 212 from a presentation server.

Client 220 can include a screen parser plug in extension 222 to parse the displayed presentation or slide images based on rendered guest screen data 212. Screen parser extension 222 can identify both element patterns and live elements (embedded) in desktop applications. Client 224 can also include a screen renderer extension 224. Screen renderer extension 224 can, after screen parser extension 222 has identified necessary hot spots, mark each element region of client 220 display screen with a passive element region and hot spot overlay as a clickable or selectable link to additional content.

The hot spot overlay painted by the screen renderer extension 224 can be non-visible and positioned on top of the passive element as determined by a z-order of the client application running the presentation. This ensures that the hot spot overlay is placed in the z-order list above the passive element and the guest screen data 212 that is rendered on client 220 display.

Figure 2A:
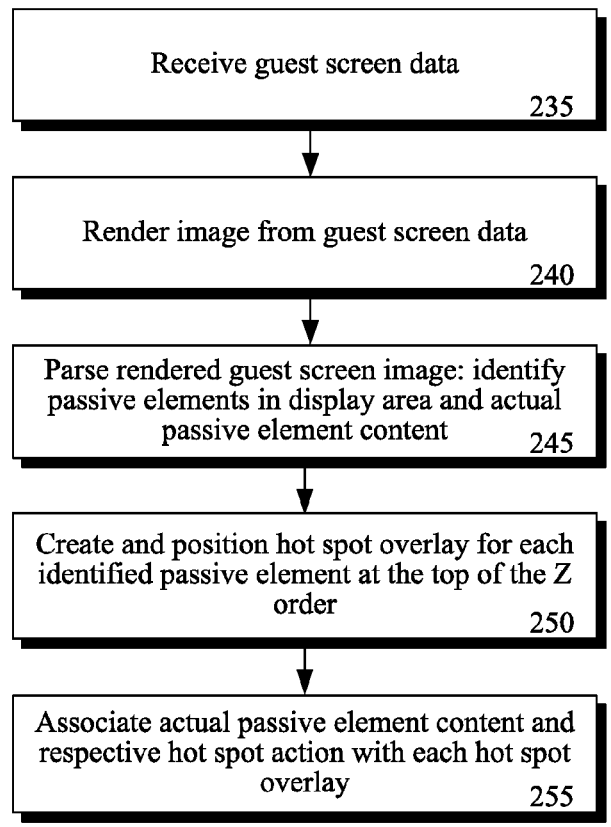
FIG. 2A is a flow chart of a client-only embodiment method for identifying passive elements, their respective content and creating hot spot overlays associated with hot spot actions utilizing passive element content to perform a hot spot action in accordance with embodiments of the inventive arrangements disclosed herein.

FIG. 2A is a flow chart 230 of a client-only embodiment 210 method for identifying passive elements, their respective content and creating hot spot overlays associated with hot spot actions utilizing passive element content to perform a hot spot action in accordance with embodiments of the inventive arrangements disclosed herein.

In step 235, the device can receive guest screen data from a server. In step 240, an image can be rendered for display based on guest screen data received. Since the device only received guest screen data it can only render a dead stream of images representative of the host screen display. At this step no live actions of the remote presentation are available from the client display.

In step 245, the client device can parse the rendered guest screen image. Parsing can be completed with, for example, a screen parser plug in extension 222. Parsing the guest screen image can allow the client device to identify passive elements in the display area, which can correspond to active elements on the host screen, and record actual passive element content. Actual passive element content can be the text displayed on the screen in the form of a hyperlink, email address, etc.

In step 250, the device's screen rendered extension can create and position hot spot overlays for each identified passive element. The overlays are ranked at the top of the z-order of the client application running the remote presentation.

In step 255 the specific actual passive element content recorded in step 245 can be associated with the hot spot overlay. Additionally, respective hot spot actions, which can be performed upon viewer selection of the hot spot overlay, can be associated with each hot spot overlay.

Figure 3:
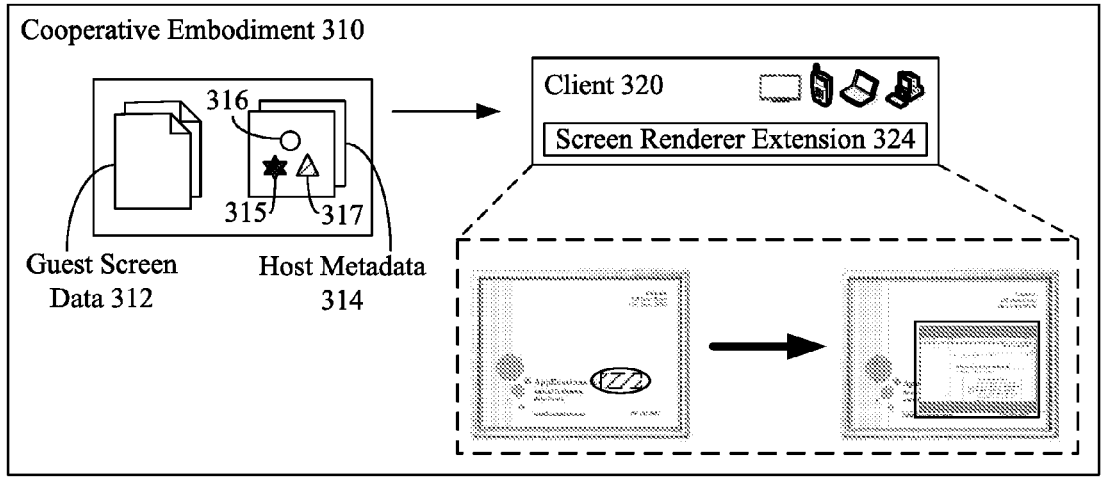
FIG. 3 is a depiction of a cooperative embodiment including host metadata and guest screen information in accordance with embodiments of the inventive arrangements disclosed herein.

FIG. 3 is a depiction 300 of a cooperative embodiment 310 including host metadata and guest screen information in accordance with embodiments of the inventive arrangements disclosed herein. The cooperative embodiment 310 can include a client 320 device receiving host metadata 314 in addition to guest screen data 312.

Host metadata 314 can include various elements identified on the server side host presentation that can result in setting up passive elements and associated hot spot overlays without client side parsing of the provided guest screen data 312. This embodiment, however, requires that the server device be able to parse the presentation document and prepare host metadata 314 to be sent to client 320 device.

Host metadata 314 can include screen region 315 location of active elements in the host screen, active element content 316, and active action 317 information. Screen region 315 can be a relative position of all active element in regards to each other and screen quadrants or regions. Screen region 315 can also be defined more strictly in terms of pixel locations and boundaries of active element regions on the host screen.

Active element content 316 can contain the actual linked data, for example, but not limited to a telephone, an email address, URL (hyperlink), coordinate address information, and the like. Active actions 317 can specifically be linked to each one of the active element content 316 records. For instance, if a specific active element content 316 is a telephone number it can trigger one or more of a set of actions 317. In this instance, actions 317 can include, but are not limited to, that the contact information can be added to the viewer's address book or be called up via VoIP applications such as SKYPE or by a mobile phone call application.

Client 320 can include a screen rendered plug in extension 324 that can utilize the various received host metadata element 315 to paint hot spot regions in the display screen. Additionally, screen renderer plug in extension can associate appropriate content and actions 316, 317 with each marked hot spot overlays.

Figure 3A:
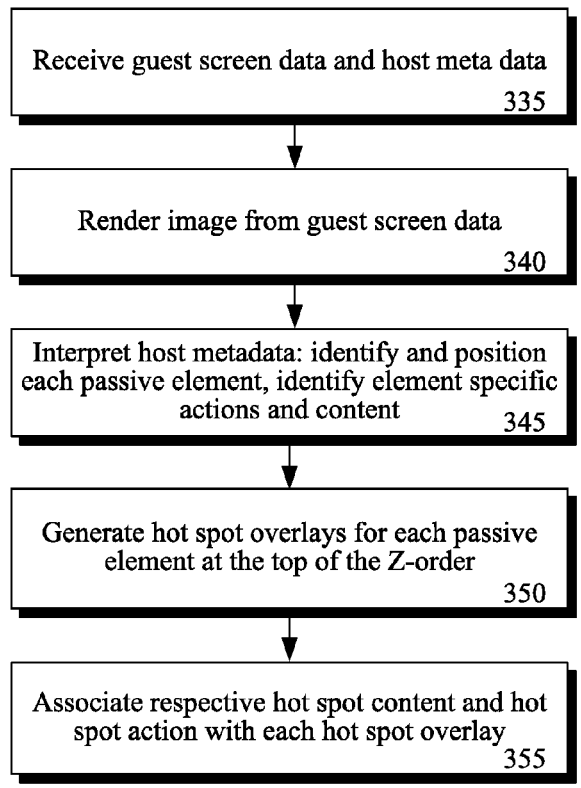
FIG. 3A is a flow chart of a cooperative embodiment method for generating hot spot information from host provided metadata and positioning such a hot spot within the guest screen in accordance with embodiments of the inventive arrangements disclosed herein.

FIG. 3A is a flow chart of a cooperative embodiment 310 method for generating hot spot information from host provided metadata and positioning such a hot spot within the guest screen in accordance with embodiments of the inventive arrangements disclosed herein.

In step 335, the client device can receive guest screen data along with host metadata. In step 340, the presentation or slide image can be rendered based on the received guest screen data. This image does not as of this step contain live additional external content references. Rather, it presents a dead streamed image from the presentation server host screen.

In step 345, the client device can interpret the received host metadata. Each passive element necessary for the client screen can be identified and positioned based on active element position metadata. Additionally, element specific actions and content can be recorded for each passive element to be linked to a hot spot overlay for each passive element.

In step 350, the screen renderer extension can utilize the previously interpreted hot metadata elements to generate hot spot overlays for each passive element at the top of the z-order of the presentation application. The hot spot overlays painted by the screen renderer extension can be non-visible. In step 355, the screen renderer extension can associate respective hot spot content and hot spot actions with each hot spot overlay based on the interpreted and recorded host metadata.

Figure 4:
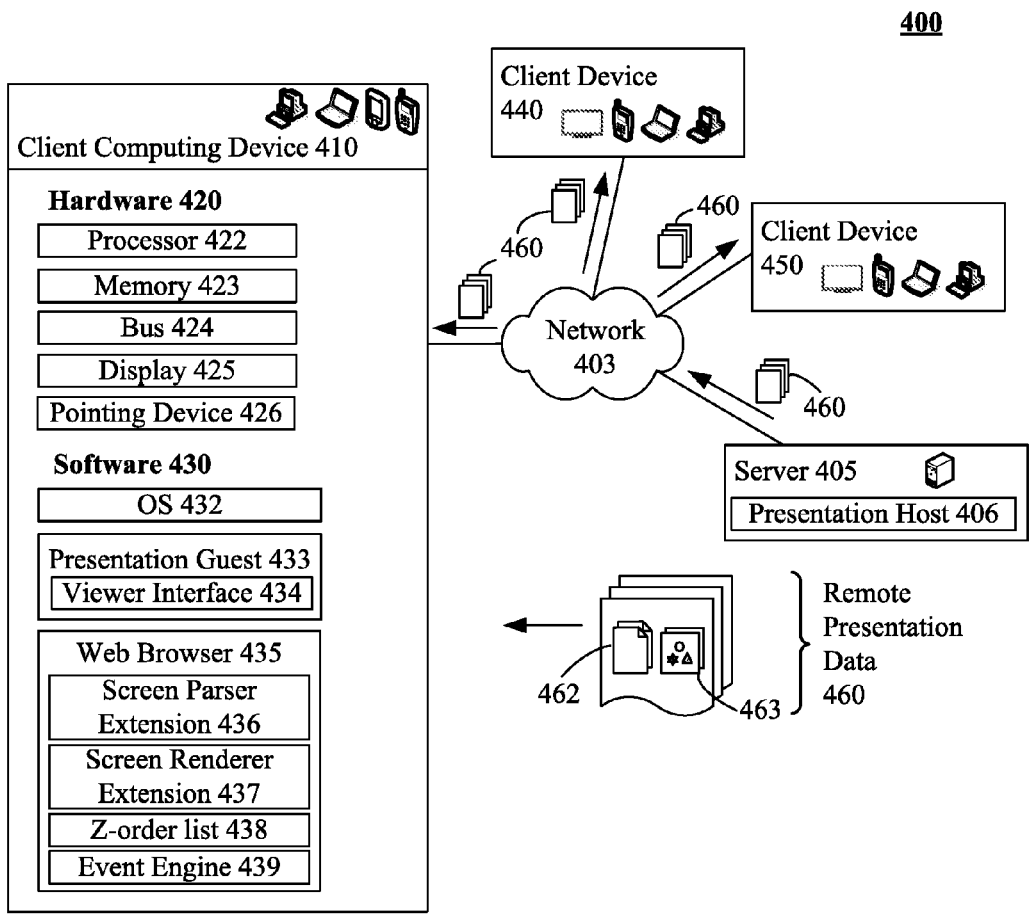
FIG. 4 is a schematic diagram illustrating a system within a network environment for enabling a server side presentation host's active content to be live on a client device in accordance with embodiments of the inventive arrangements disclosed herein.

FIG. 4 is a schematic diagram illustrating a system 400 within a network environment for enabling a server side presentation host's active content to be live on a client device in accordance with embodiments of the inventive arrangements disclosed herein. Client computing devices 410, 440, 450 can receive remote presentation data 460 that can include guest screen data 462 and host metadata 464 as described in FIGS. 1 through 3. The system 400 can include several client devices 410, 440, 450 and server 405 connected via network 403. Server 405 can include a presentation host 406 application to launch the remote presentation environment and transfer necessary remote presentation data 460 to client devices 410, 440, 450.

Network 403 can include any hardware/software/and firmware necessary to convey data encoded within carrier waves. Data can be contained within analog or digital signals and conveyed though data or voice channels. Network 403 can include local components and data pathways necessary for communications to be exchanged among computing device components and between integrated device components and peripheral devices. Network 403 can also include network equipment, such as routers, data lines, hubs, and intermediary servers which together form a data network, such as the Internet. Network 403 can also include circuit-based communication components and mobile communication components, such as telephony switches, modems, cellular communication towers, and the like. Network 403 can include line based and/or wireless communication pathways.

Client computing devices 440 and 450 can include all components shown for client computing device 410. The computing device 410, as well as client device 440 and client device 450 can include a personal computer, a notebook computer, a netbook, a tablet, a smart phone, a kiosk, a home internet appliance, an embedded system, an entertainment console, and the like. Client device 410 can be a general purpose computing device able to have its functionality modified by updating or changing installed applications, can be a special purpose computing device designed for a specific set of functionality that is not user modifiable (or minimally so, such as through a firmware upgrade), or can be a device with an intermediate level of user modifiability (i.e., plug-ins or apps can be installed by a user who is otherwise not able to modify core functionality of the device).

Client 410 can include hardware 420 and software 430, where the software can be stored on a non-transient storage medium, such as a memory 423. Memory 423 can be a volatile or nonvolatile storage space for containing digitally encoded data. Hardware 420 can also include a bus 424, which communicatively links device 410 components, such as processor 422, memory 423, display 425, and pointing device 426 to each other. Other components (not shown) are contemplated.

Each of the software 430 items can also be referred to as a computer program product. The software 430 can include any set of computer readable instructions able to be stored on a memory and able to cause the processor 422 to perform a set of actions. Software 430 can include an operating system 432, a presentation guest 433 and a web browser 435 executing on top of the operating system, firmware, and the like.

Presentation guest 433 can include a viewer configuration interface 434 responsible for recording and maintaining viewer guest screen preferences associated with hot spot events and actions. Preferences can include, but are not limited to, the type of content to be identified and painted as hot spot overlays, specific hot spot actions associated with a type of content, and the like. It should be noted that although not shown, server 405 can include a similar configuration interface for the presenter to utilize within presentation host 406 application.

Web browser 435 can include optional screen parser extension 436, screen renderer extension 437, z-order list 438, and event engine 439. The web browser 435 can be an application linked to or utilized by presentation guest 433 to execute participation in a remote presentation environment, which includes an ability of the web browser 435 to remote presentation data 460 within presentation guest 433 application on client 410. Additionally, as described in FIGS. 1 through 3, web browser 435 can be called upon during execution of a hot spot action to launch additional content.

Screen parser extension 436 can be a plugin extension configured to parse the displayed presentation or slide images based on rendered guest screen data 462. Screen parser extension 436 can identify both element patterns and live elements (embedded) in desktop applications. Screen renderer extension 437 can, after screen parser extension 436 has identified necessary hot spots, mark each element region of client 410 display 525 screen with a passive element region and hot spot overlay as a clickable or selectable link to additional content as described in FIGS. 1 through 3.

It should be noted that in one embodiment in which client 410 receives both guest screen data 462 and host metadata 464, client 410 does not utilize a screen parser 436 extension. Host metadata 464 already contains relevant information regarding passive element and hot spot overlay regions/locations associated content and hot spot actions. In this embodiment, however, it is imperative that server 406 be able to parse host screen data to prepare host metadata 464 to send along with guest screen data 462.

The z-order list 438 determines an order that elements (specifically passive elements and hot spot overlays) of the remote presentation guest screen are stacked relative to each other. Event engine 439 can handle pointing device 426 actions for presentation guest application 433. For example, event engine 439 can enable onmouseover or onmouseclick handlers to launch viewer specific activated hot spot actions of the client 410, 440, 450.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method performed within a client, comprising:

receiving, by the client and from a server, guest screen data representing an image that includes an active element upon being displayed by a host screen of a presentation host:

presenting, by the client and using the guest screen data, a guest screen corresponding to the host screen;

identifying, within the guest screen data, a passive element corresponding to the active element and presented within the guest screen;

selecting, based upon the identified passive element, a selectable graphical user interface;

overlaying, in the guest screen, the passive element with the selectable graphical user interface, wherein the active element, upon being selected within the host screen, causes an active action to be performed by the presentation host, and the selectable graphical user interface, upon being selected within the guest screen, causes the client to perform a client-side action equivalent to the active action.

2. The method of claim 1, further comprising:

detecting a region of the guest screen data;

converting the region into textual data;

determining that the textual data represents the active element;

identifying, based upon the active element, the active action; and automatically generating the selectable graphical user interface.

3. The method of claim 1, wherein the guest screen is displayed by the client concurrently with the presentation host displaying the host screen.

4. The method of claim 1, wherein the active element is a hyperlink, and selection of the selectable graphical user interface directs the guest screen to data referenced by the hyperlink.

5. The method of claim 1, wherein the guest screen data includes host metadata, and the host metadata identifies a location of the active elements.

6. The method of claim 5, wherein the location of the active element identified by the host metadata is used to identify the passive element corresponding to the active element.

7. The method of claim 5, wherein the host metadata is generated by the server.

8. A client, comprising:

a hardware processor configured to initiate:

receiving, by the client and from a server, guest screen data representing an image that includes an active element upon being displayed by a host screen of a presentation host:

presenting, by the client and using the guest screen data, a guest screen corresponding to the host screen;

identifying, within the guest screen data, a passive element corresponding to the active element and presented within the guest screen;

selecting, based upon the identified passive element, a selectable graphical user interface;

overlaying, in the guest screen, the passive element with the selectable graphical user interface, wherein the active element, upon being selected within the host screen, causes an active action to be performed by the presentation host, and the selectable graphical user interface, upon being selected within the guest screen, causes the client to perform a client-side action equivalent to the active action.

9. The client of claim 8, wherein the hardware processor is further configured to initiate:

detecting a region of the guest screen data;

converting the region into textual data;

determining that the textual data represents the active element;

identifying, based upon the active element, the active action; and automatically generating the selectable graphical user interface.

10. The client of claim 8, wherein the guest screen is displayed by the client concurrently with the presentation host displaying the host screen.

11. The client of claim 8, wherein the active element is a hyperlink, and selection of the selectable graphical user interface directs the guest screen to data referenced by the hyperlink.

12. The client of claim 8, wherein the guest screen data includes host metadata, and the host metadata identifies a location of the active elements.

13. The client of claim 12, wherein the location of the active element identified by the host metadata is used to identify the passive element corresponding to the active element.

14. The client of claim 12, wherein the host metadata is generated by the server.

15. A computer program product, comprising:

a computer readable storage medium having computer readable program code stored therein, the computer readable program code, which when executed by a hardware client, causes the client to perform:

receiving, by the client and from a server, guest screen data representing an image that includes an active element upon being displayed by a host screen of a presentation host:

presenting, by the client and using the guest screen data, a guest screen corresponding to the host screen;

identifying, within the guest screen data, a passive element corresponding to the active element and presented within the guest screen;

selecting, based upon the identified passive element, a selectable graphical user interface;

overlaying, in the guest screen, the passive element with the selectable graphical user interface, wherein the active element, upon being selected within the host screen, causes an active action to be performed by the presentation host, and the selectable graphical user interface, upon being selected within the guest screen, causes the client to perform a client-side action equivalent to the active action.

16. The computer program product of claim 15, wherein the hardware processor is further configured to initiate:
   detecting a region of the guest screen data;
   converting the region into textual data;
   determining that the textual data represents the active element;
   identifying, based upon the active element, the active action; and
   automatically generating the selectable graphical user interface.

17. The computer program product of claim 15, wherein the guest screen is displayed by the client concurrently with the presentation host displaying the host screen.

18. The computer program product of claim 15, wherein the active element is a hyperlink, and
   selection of the selectable graphical user interface directs the guest screen to data referenced by the hyperlink.

19. The computer program product of claim 15, wherein the guest screen data includes host metadata, and
   the host metadata identifies a location of the active elements.

20. The computer program product of claim 19, wherein the location of the active element identified by the host metadata is used to identify the passive element corresponding to the active element.

\* \* \* \* \*